United States Patent [19]
Jacobson

[11] 4,315,109
[45] Feb. 9, 1982

[54] ELECTRONIC RING SOUNDER FOR A SPEAKER TELEPHONE

[76] Inventor: Sava Jacobson, 8130 Orion Ave., Van Nuys, Calif. 91406

[21] Appl. No.: 96,017

[22] Filed: Nov. 20, 1979

[51] Int. Cl.³ .............................................. H04M 1/26
[52] U.S. Cl. ................................ 179/84 T; 179/81 B
[58] Field of Search ................. 179/84 R, 84 T, 81 B, 179/1 HF, 99 A, 99 P

[56] References Cited

U.S. PATENT DOCUMENTS

| | | | |
|---|---|---|---|
| 3,459,899 | 8/1969 | Lane et al. | 179/84 T |
| 3,594,515 | 7/1971 | Brown | 179/84 T |
| 3,789,155 | 1/1974 | Fensom | 179/84 T |

*Primary Examiner*—Bernard Konick
*Assistant Examiner*—J. A. Popek
*Attorney, Agent, or Firm*—Spensley, Horn, Jubas & Lubitz

[57] ABSTRACT

This electronic ring sounder utilizes the loudspeaker and audio amplifier present in a speaker telephone to accomplish the bell sounding function. To this end, the amplifier is provided with a feedback circuit which, when enabled, causes the amplifier to oscillate in the audio frequency range. The feedback path includes a gate which is enabled in response to presence of the ring tone on the telephone line. Advantageously, the oscillation frequency is on the order of 1,000 Hz, and is gated on each half cycle of the ring signal. This produces a sound which closely simulates that of a conventional telephone bell.

5 Claims, 3 Drawing Figures

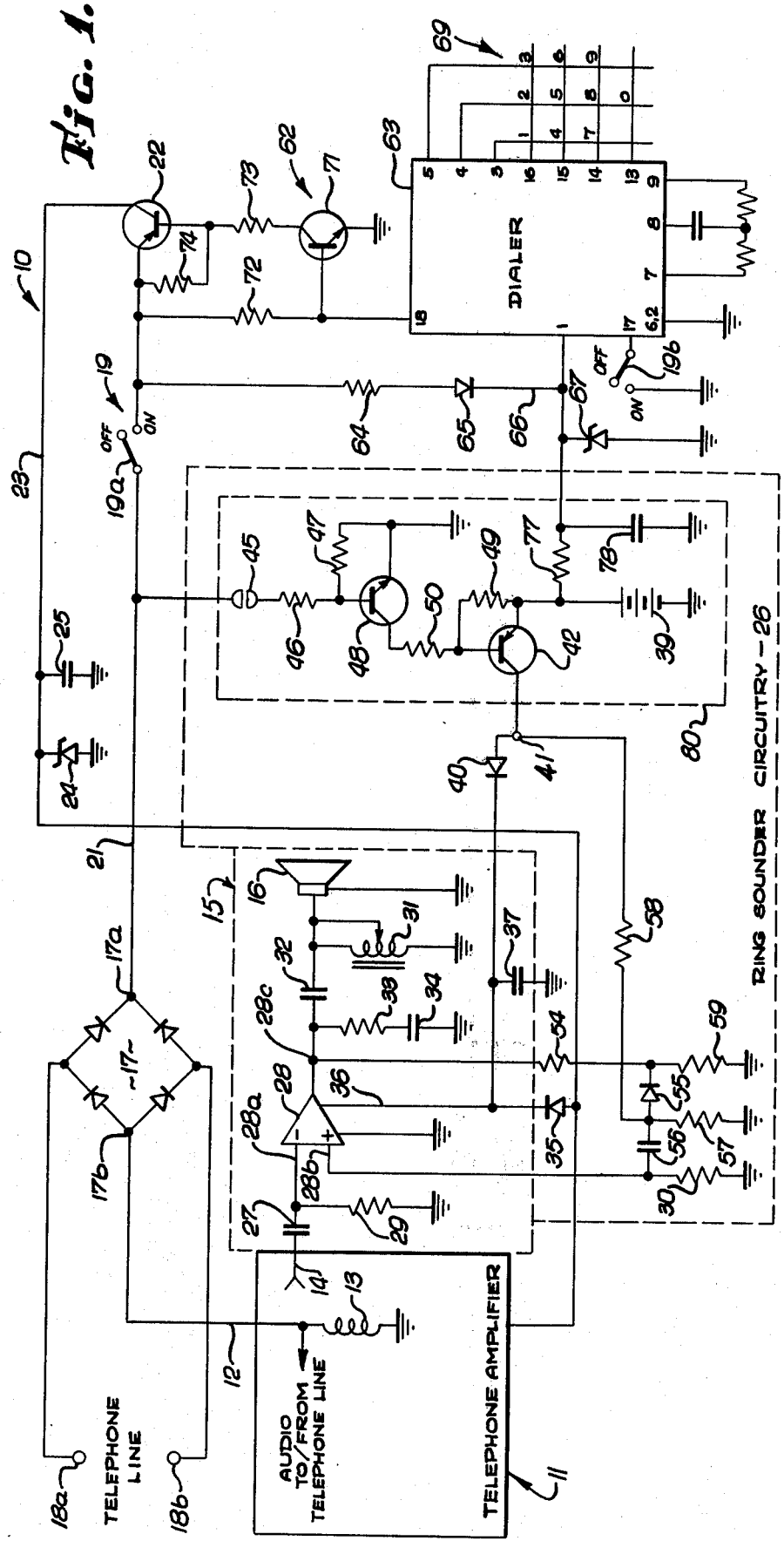
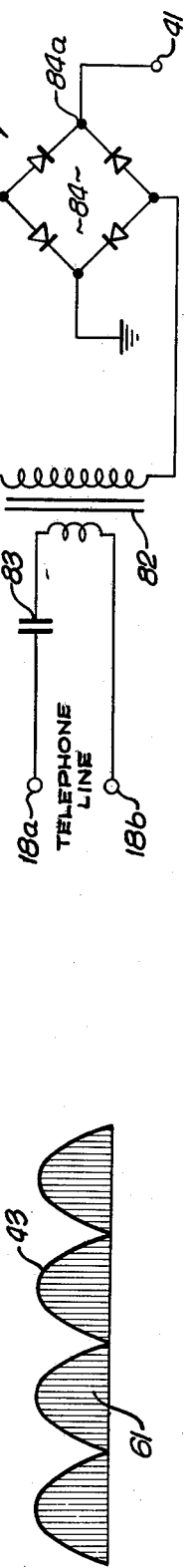

ELECTRONIC RING SOUNDER FOR A SPEAKER TELEPHONE

BACKGROUND OF THE INVENTION

1. Field of the Invention

The present invention relates to an electronic ring sounder for a speaker telephone, which functions in place of the conventional bell in a handset telephone instrument when the speaker telephone is used independently of such an instrument.

2. Description of the Prior Art

Telephone amplifiers have gained considerable acceptance as an add-on for converting an existing handset telephone instrument to a speaker telephone. Typically the telephine amplifier is connected in parallel with the handset instrument, so that when a call is received, the ring signal from the telehone line causes the bell in the handset instrument to ring. The user then has the option of either lifting the handset or switching in the telephone amplifier while leaving the handset physically on the cradle.

In the telephone amplifier, incoming speech is amplified and reproduced by a loudspeaker. The user's voice is picked up by a microphone and amplified for transmission to the line. Appropriate voice responsive circuitry isolates the outgoing and incoming signals, and prevents audio feedback from the loudspeaker to the microphone. The telephone amplifier offers the convenience of "no hands" operation.

For outgoing calls, the dial or tone-enabling pushbuttons on the handset telephone instrument are used to dial a number. Thus with an add-on telephone amplifier, the existing handset telephone instrument provides both the bell which rings to indicate an incoming call, and the dial or pushbutton mechanism for initiating an outgoing call.

By providing a telephone amplifier with dialing and ring sounding capabilities, the unit can act as a self-contained speaker telephone. It can be used completely independently of a handset telephone instrument. Dialing mechanisms for use with such a speaker telephone are known per se. The principal object of the present invention is to provide an electronic bell or ring sounder for such a speaker telephone which functions in place of the conventional telephone bell.

SUMMARY OF THE INVENTION

This and other objectives are achieved by providing an electronic ring sounder which utilizes the loudspeaker and audio amplifier present in a speaker telephone to accomplish the bell sounding function. To this end, the amplifier is provided with a feedback circuit which, when enabled, causes the amplifier to oscillate in the audio frequency range. The feedback path includes a gate which is enabled in response to occurrence of the ring tone on the telephone line. Advantageously, the oscillation frequency is on the order of 1,000 Hz, and is gated on each half cycle of the ring signal. This produces a sound which closely simulates that of a conventional telephone bell.

In one embodiment the ring signal is rectified by a diode bridge, and the resultant rectified half cycle signals are supplied via a neon bulb to the base of a transistor. This transistor functions as a switch which, during each half cycle of the ring signal, connects the voltage from a battery to the amplifier circuit. This gated voltage is used (a) to provide dc power to the amplifier, and (b) to enable the feedback circuit which results in audio oscillation of the circuit.

In an alternative embodiment the ring signal is coupled via a transformer to a diode bridge. The resultant rectified ring signal iself is used to provide both the dc power to the amplifier and to enable the feedback oscillation.

Advantageously, the inventive electronic bell sounder is used in conjunction with a telephone amplifier and a dialing mechanism, each known per se, so as to implement a self-contained speaker telephone. Power for the speaker telephone may be derived directly from the telephone line.

BRIEF DESCRIPTION OF THE DRAWINGS

A detailed description of the invention will be made with reference to the accompanying drawings wherein like numerals designate corresponding elements in the several figures.

FIG. 1 is an electrical schematic diagram of a speaker telephone incorporating an electronic ring sounder in accordance with the present invention.

FIG. 2 illustrates a typical waveshape of the audio "bell" signal produced by the sounder of FIG. 1.

FIG. 3 is an electronic schematic diagram of an alternative embodiment of the invention useful with the speaker telephone of FIG. 1.

DESCRIPTION OF THE PREFERRED EMBODIMENTS

The following detailed description is of the best presently contemplated modes of carrying out the invention. This description is not to be taken in a limiting sense, but is made merely for the purpose of illustrating the general principles of the invention since the scope of the invention best is defined by the appended claims. Operational characteristics attributed to forms of the invention first described also shall be attributed to forms later described, unless such characteristics obviously are inapplicable or unless specific exception is made.

In the embodiment of FIG. 1, the self-contained speaker telephone 10 advantageously operates in conjunction with a known telephone amplifier 11 such as that disclosed in the inventor's U.S. Pat. No. 4,025,728 entitled SPEAKER TELEPHONE. Audio to and from the telephone line enters the amplifier 11 via a line 12 across an inductor 13 which loads the telephone line. The amplifier 11 includes a microphone and associated amplifier and voice controlled circuitry which pick up the user's speech and transmits this to the telephone line via the line 12. Incoming audio received via the line 12 is appropriately preamplified and gated via a line 14 to an amplifier circuit 15 which drives a loudspeaker 16. In the embodiment 10, the line 12 is connected to the telephone line via a diode bridge 17 and a pair of terminals 18a, 18b.

To answer or initiate a telephone call, the user closes an on-off switch 19. The switch contact 19a then completes a circuit which both loads the telephone line (i.e., creates an "off-hook" situation), and derives dc power for the amplifier 11 from the bias present on the telephone line. The circuit path extends from the positive terminal 17a of the bride 17 via a line 21, the switch arm 19a, a conducting transistor 22, a line 23, and a zener diode 24 to ground. The return is via the inductor 13 and the line 12 to the negative terminal 17b of the bridge 17. Current through the inductor 13 loads the telephone line. DC bias from the telephone line appears across the zener diode 24 and is filtered by a capacitor 25. By use of the bridge 17, this voltage is always positive at the line 23 with respect to ground. The magnitude of the voltage +V on the line 23 is established by the breakdown voltage of the zener diode 24, and typically may be +8.5 volts. This voltage +V is used to power the telephone amplifier 11 and the loudspeaker driver amplifier circuit 15 after a call has been established.

In accordance with the present invention, ring sounder circuitry 26 is used in conjunction with the driver amplifier circuit 15 and loudspeaker 16 to produce an audio ring sound in response to the presence of a ring signal on the telephone line. That is, these elements 26, 15 and 16 cooperate as an electronic substitute for the electromechanical bell in a conventional handset telephone instrument.

The circuitry 26 establishes a gated feedback path for the amplifier 15 which causes oscillation thereof in the audio range. The feedback is gated by the envelope of the rectified telephone line ring signal, so that the loudspeaker 16 produces a sound which simulates a mechanical bell. The audio waveform is illustrated in FIG. 2. At the same time, dc power for the amplifier circuit 15 is gated by occurrence of the ring signal.

In the driver amplifier circuit 15, incoming speech from the line 14 is coupled via a capacitor 27 to the inverting (−) input terminal 28a of a conventional integrated circuit audio amplifier 28 such as that sold commercially as type NS386N. The input terminal 28a also is connected to ground via a resistor 29, and the non-inverting (+) input terminal 29b is connected to ground via a resistor 30. The amplified audio is coupled from the amplifier output terminal 28c to the speaker 16 via an auto-transformer 31 and a coupling network including a capacitor 32, a resistor 33 and a capacitor 34. During the call, dc power is provided to the amplifier 28 from the line 23 via a diode 35 and a line 36 that is bypassed to ground by a capacitor 37. During the call the circuit 15 operates as a conventional audio amplifier to drive the speaker 16 with the incoming speech.

Prior to the answering or initiation of a call, the switch 19 is open. Thus there is no dc voltage on the line 23. Instead, a battery 39 is used to power the circuit 15 during the sounding of a ring. When a ring signal occurs on the telephone line, voltage from the battery 39 is gated to the integrated circuit amplifier 28 via the line 36, a diode 40, a line 41 and a transistor 42 which is turned on during each half cycle of the ring signal. As described below, the resultant voltage that is gated to the line 41 also enables a a feedback circuit which causes audio oscillation of the amplifier 28 with concomitant tone production.

The telephone line ring signal itself typically consists of a 20 Hz sub-audio wave having a peak amplitide in excess of 70 volts. When rectified by the full wave bridge 17, alternate half cycles of the ring signal are inverted to produce a unipolar signal having a nominal frequency of 40 Hz and represented by the solid waveform 43 of FIG. 2. The current path during ring signal rectification is from the bridge 17 via the line 21, a neon bulb 45, a resistor 46, the base-to-emitter path of a transistor 48 (which is shunted by a resistor 47) to ground, and then via the inductor 13 back to the bridge 17.

During a portion of each cycle of the rectified ring signal 43, the amplitude of this signal on the line 21 exceeds the turn-on voltage of the neon bulb 45. During these periods current flow through the path described above turns on the transistor 48, thereby establishing current flow from the battery 39 through a pair of resistors 49, 50 and the transistor 48 to ground. As a result the transistor 42 goes on and gates the voltage from the battery 39 to the circuit 15 during a portion of each cycle of the rectified ring signal 43. The value of the resistor 46, together with the standoff voltage of the neon bulb 45, is sufficiently high so as to limit the dc current flow drawn from the telephone line to less than 10 microamperes for a peak telephone line test voltage of 100 volts.

To cause audio oscillation of the amplifier a positive feedback path is provided from the output terminal 28c to the non-inverting (+) input terminal 28b via a resistor 54, a diode 55 and a capacitor 56 the junction of which is connected to ground via a resistor 57. The values of the components in this feedback path establish the oscillation frequency of the amplifier 28. For example, these may be selected so as to result in an oscillation frequency of about 1,000 Hz.

The diode 55 is poled so as to inhibit feedback in the absence of a positive voltage on the line 41. Thus the feedback path is disabled at all times except during the presence of a ring signal on the telephone line. When a ring signal does occur, the voltage from the battery 39 that is periodically gated to the line 41 by the transistor 42 also is fed to the diode 55 via the resistors 57, 58 and 59. This forward biases the diode 55 thereby opening the feedback path via the capacitor 56, and causing audio oscillation of the amplifier 28. In this manner the diode 55 acts as a switchable element in the feedback path that is switched on during half cycles of the ring signal.

The envelope of this typically 1,000 Hz audio oscillation, represented by the shaded waveform 61 in FIG. 2, is established by the rectified ring signal 43. This modulated oscillation is reproduced by the loudspeaker 16 to create a sound which resembles a mechanical bell. Note that during oscillation the circuit 15 is powered by the battery 39 which is simultaneously gated to the amplifier power line 36 via the diode 40. Thus the ring tone is sounded even though the switch 19 is off.

The speaker telephone 10 also includes a dialing circuit 62 the principle component of which is a commercially available integrated circuit dialer 63 such as the Mostek type MK5099 chip. To accomplish dialing, the user closes the switch 19 so that the switch contact 19b completes a current supply path to the dialer chip 63. Positive dc voltage then is supplied to the chip 63 from the line 21 via the switch contact 19a, a resistor 64, a diode 65 and a line 66 which is shunted to ground by a zener diode 67 that establishes the supplied voltage level.

A dialing pushbutton switch matrix 69 is connected to the chip 63. When any switch in this matrix is closed, a pulse signal occurs on a line 70 that is connected to the base of a transistor 71 and to the emitter of the transistor 22 via a resistor 72. Each pulse turns off the transistor 71 which is connected to the base of the transistor 22 via a pair of resistors 73 and 74. As a result each pulse on the line 70 causes a concomitant turn-off of the transistor 22, thereby correspondingly open circuiting the telephone line load path through the inductor 13. The dialer chip 63 is arranged so that the number of pulses present on the line 70 corresponds to the numerical value (1 through 10) of the corresponding pushbutton switch in the matrix 69. As a result, interrupt dialing is accomplished by the chip 63 in conjunction with the transistor 22 and associated circuitry.

The dialer chip 63 has a memory function for remembering the last number dialed. During the time that the switch 19 is off, the battery 39 supplies stand-by power to the chip 63 via a resistor 77 and a capacitor 78. The stand-by power enables the chip 63 to remember the last number dialed even though the speaker telephone 10 is turned off.

An alternative embodiment of the invention is shown in FIG. 3. Here all of the ring signal envelope detection circuitry included within the block 80 in FIG. 1 is eliminated, and replaced by the circuit 81 of FIG. 3.

The circuit 81 includes an audio step-down transformer 82 that is connected to the telephone line via a capacitor 83. The ring signal is coupled by the transformer 82 to a diode bridge 84 the positive output terminal 84a of which is connected to the line 41 (in place of the output from the transistor 42). Now, a unipolar rectified ring signal, corresponding to the waveform 43 of FIG. 2 is supplied directly to the line 41 by the diode bridge 84. This signal acts as before simultaneously to provide power to the amplifier 15 and to enable the feedback which causes oscillation of the amplifier 28. Once again, the speaker 16 will reproduce the tone signal illustrated by the waveshape 61 in FIG. 2 thereby simulating a bell sound. In this manner, ring sounding is facilitated electronically in the self-contained speaker telephone 10.

I claim:

1. An electronic ring sounder for a speaker telephone of the type in which speech incoming from the telephone line is supplied to a speaker via a driver amplifier, comprising:
   feedback means for causing audio oscillation of said amplifier,
   ring enabling means, operatively connected to said telephone line, for enabling said feedback means in response to the presence of a ring signal on said telephone line, the resultant audio oscillation of said amplifier driving said speaker to produce a sound corresponding to a telephone bell,
   said feedback means including a positive feedback circuit connected between the output of said amplifier and the input thereof, said feedback circuit including a switchable element in series with an oscillation frequency determining element, and wherein said ring enabling means switches on said switchable element in response to occurrence of said ring signal.

2. An electronic ring sounder according to claim 1 wherein said ring enabling means further comprises:
   means for applying power to said amplifier simultaneously with the enabling of said feedback means.

3. An electronic ring sounder according to claim 1 wherein said ring enabling means comprises:
   a transformer having a primary coupled to said telephone line and a secondary coupled via a rectifier to said switchable element, the ring signal coupled via said transformer being rectified by said rectifier and supplied to turn on said switchable element.

4. An electronic ring sounder according to claim 1 wherein said ring enabling means comprises:
   a battery,
   a transistor connected to gate voltage from said battery to said switchable element,
   rectifier means for rectifying the ring signal from said telephone line, and
   neon bulb means, interconnecting said rectifier means and said transistor, for turning on said transistor in response to a rectified ring signal, the voltage from said battery thereby being gated via said transistor to turn on said switchable element.

5. An electronic ring sounder for a speaker telephone of the type in which speech incoming from the telephone line is supplied to a speaker via a driver amplifier, comprising:
   feedback means for causing audio oscillation of said amplifier,
   ring enabling means, operatively connected to said telephone line, for enabling said feedback means in response to the presence of a ring signal on said telephone line, the resultant audio oscillation of said amplifier driving said speaker to produce a sound corresponding to a telephone bell, said ring enabling means including:
   a bridge rectifier connected to full wave rectify the ring signal from the telephone line, thereby producing a substantially unfiltered pulsating dc signal having a frequency twice that of said ring signal,
   said ring enabling means including circuitry, cooperating with said feedback means, for causing said audio oscillation only during a portion of each cycle of said unfiltered pulsating dc signal so that said audio oscillation is envelope modulated thereby.

* * * * *